(12) United States Patent
Miller et al.

(10) Patent No.: US 11,945,287 B2
(45) Date of Patent: Apr. 2, 2024

(54) VEHICLE OR VESSEL WINDOW ASSEMBLY

(71) Applicant: AdvanTec Global Innovations Inc., Chilliwack (CA)

(72) Inventors: Brad Miller, Chilliwack (CA); Dean Robinson, Chilliwack (CA); Martin Raska, Chilliwack (CA)

(*) Notice: Subject to any disclaimer, the term of this patent is extended or adjusted under 35 U.S.C. 154(b) by 0 days.

(21) Appl. No.: 17/744,595

(22) Filed: May 13, 2022

(65) Prior Publication Data
US 2022/0363112 A1    Nov. 17, 2022

(30) Foreign Application Priority Data

May 14, 2021  (CA) ................................. CA 3118484

(51) Int. Cl.
| | | |
|---|---|---|
| *B60J 1/14* | (2006.01) | |
| *B60J 1/00* | (2006.01) | |
| *B60J 1/16* | (2006.01) | |
| *B63B 19/00* | (2006.01) | |

(52) U.S. Cl.
CPC ................ *B60J 1/16* (2013.01); *B60J 1/007* (2013.01); *B60J 1/14* (2013.01); *B63B 19/00* (2013.01)

(58) Field of Classification Search
CPC ...... B63B 2019/0038; B63B 2019/0069; B60J 1/14; B60J 1/16; B60J 1/007
USPC .................. 296/146.16, 146.2, 190.1, 146.25
See application file for complete search history.

(56) References Cited

U.S. PATENT DOCUMENTS

| | | | | |
|---|---|---|---|---|
| 2,697,257 A | * | 12/1954 | Montgomery | .......... B63B 19/00 |
| | | | | 114/174 |
| 4,004,629 A | * | 1/1977 | Kelly | ..................... E06B 3/4681 |
| | | | | 160/90 |
| 5,362,118 A | * | 11/1994 | Houriez | .............. E05B 65/0021 |
| | | | | 49/126 |
| 2003/0110718 A1 | | 6/2003 | Boisvery | |
| 2006/0000404 A1 | | 1/2006 | Dougherty | |
| 2006/0260205 A1 | * | 11/2006 | Dufour | ................. B60J 1/1853 |
| | | | | 49/413 |

(Continued)

FOREIGN PATENT DOCUMENTS

| | | | | |
|---|---|---|---|---|
| FR | 2908147 A1 | * | 5/2008 | ................ B60J 1/16 |
| WO | WO-2017104471 A1 | * | 6/2017 | ................ B60J 1/16 |

*Primary Examiner* — Gregory A Blankenship
(74) *Attorney, Agent, or Firm* — Baumgartner Patent Law; Marc Baumgartner

(57) ABSTRACT

A window for a vehicle, a vessel or a trailer is provided, the window including a frame; a moveable glass pane, the moveable glass pane in articulatable and slidable relation to the frame; a handle, the handle including a handle shaft which is attached to the moveable glass pane at a top and a bottom region of the moveable glass pane; a top and a bottom articulating and urging mechanism, each in direct mechanical communication with the handle shaft; a top and a bottom articulating mechanism, each in indirect mechanical communication with the handle shaft; and a top and a bottom sliding assembly, which extend between the articulating and urging mechanisms and the articulating mechanisms, each sliding assembly including a slide track and a dog shaft, the slide track retained on the frame, the dog shafts slidably retained in the slide track, each dog shaft in mechanical communication with the articulating and urging mechanism and the articulating mechanism.

14 Claims, 7 Drawing Sheets

(56) References Cited

U.S. PATENT DOCUMENTS

| | | |
|---|---|---|
| 2007/0227430 A1 | 10/2007 | D-Eon |
| 2009/0044694 A1 | 2/2009 | Allor |
| 2013/0145694 A1* | 6/2013 | Park .................. B60J 1/16 49/257 |
| 2017/0254131 A1* | 9/2017 | Otsubo ............... E05F 11/32 |
| 2019/0218845 A1 | 7/2019 | Floe |
| 2021/0170834 A1* | 6/2021 | Kim .................. B60J 1/16 |
| 2022/0363112 A1* | 11/2022 | Miller ................ B63B 19/00 |

* cited by examiner

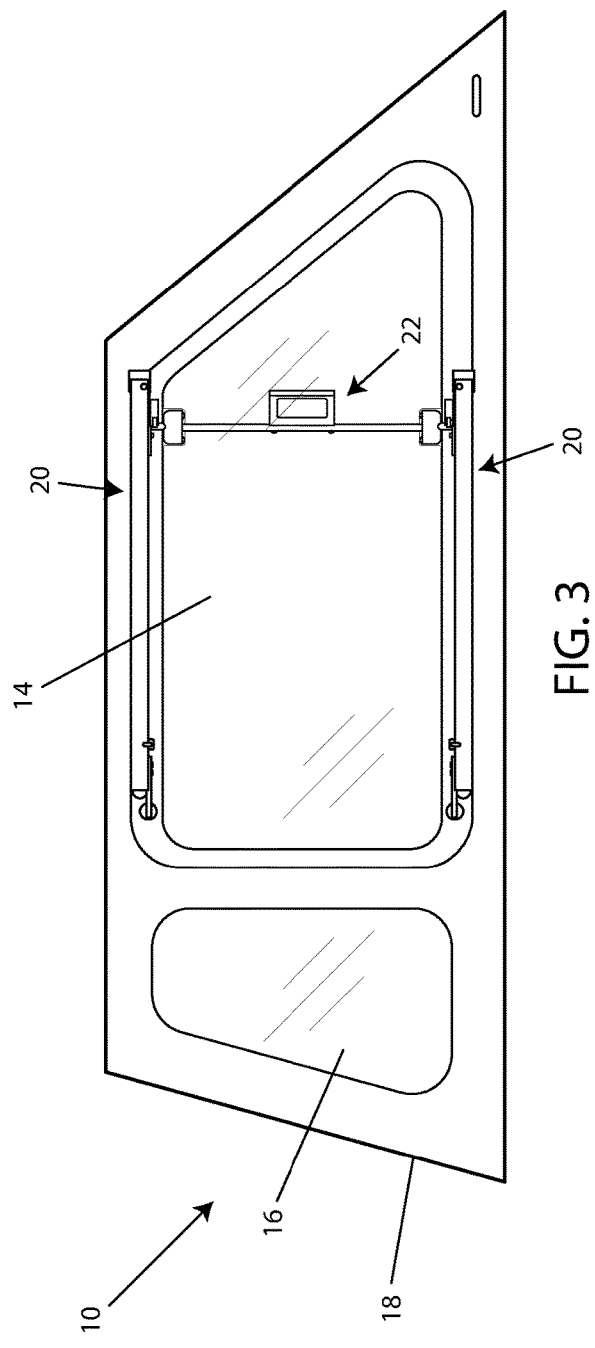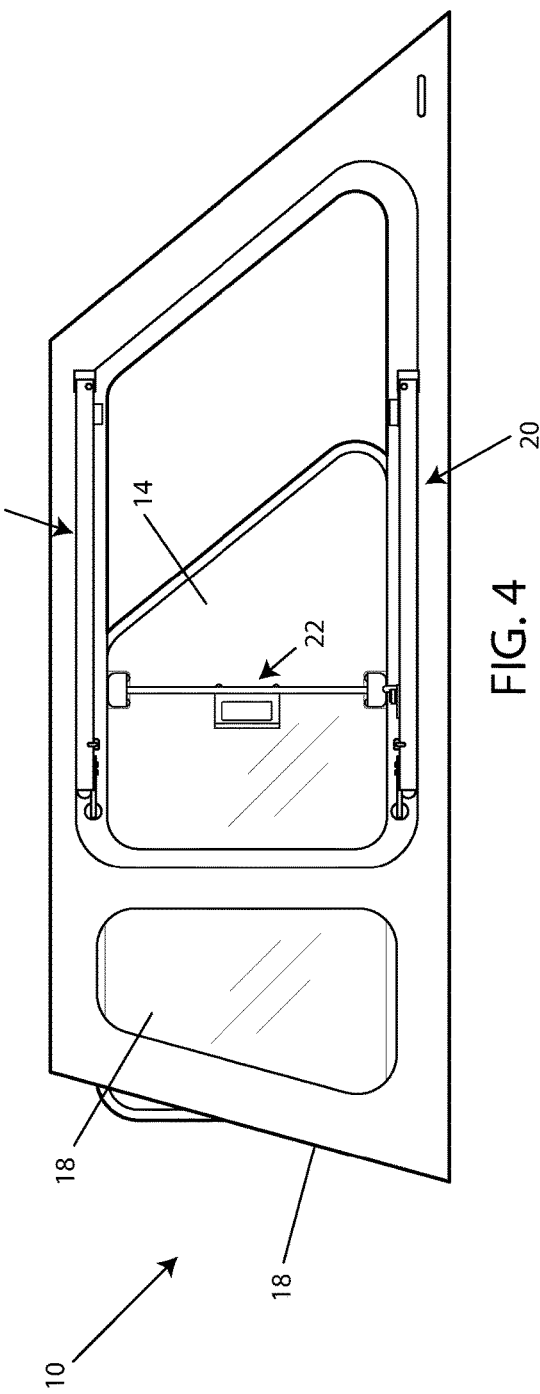

VEHICLE OR VESSEL WINDOW ASSEMBLY

CROSS REFERENCE TO RELATED APPLICATIONS

This application claims benefit of Canadian Patent Application Serial No. 3,118,484, filed on May 14, 2021, entitled BOAT WINDOW ASSEMBLY, the contents of which are incorporated herein by reference.

FIELD

The present technology is directed to a boat, recreational vehicle, other land vehicle or trailer window assembly that is glazed with direct bond glazing and includes a glass pane that is frameless. More specifically, it is a boat window assembly that includes a window that opens outwardly and along a length.

BACKGROUND

United States Patent Application Publication No. 20190218845 discloses an electronically powered window for a watercraft that consists of a shuttle frame, a sliding mechanism, a window pane, and a bottom edge support groove. A first lateral support arm and a second lateral support arm of the shuttle frame along with the bottom edge support groove helps position the window pane within the shuttle frame. The sliding mechanism allows the user to position the window pane such that the window is in an open configuration or a closed configuration. To do so, a first lateral edge is slidably positioned along the first lateral support arm. Moreover, a second lateral edge is slidably positioned along the second lateral support arm. As noted, this window has a frame. It would not be watertight.

United States Patent Application Publication No. 20090044694 discloses an adjustable louvered armor window system that comprises angled louvers made of the lightweight opaque armor. For the front window a viewing window of ballistic glass can be installed, the rear or sides could be solid armor. The louvers have overlaps to provide for gap protection. When no threat is present, the louvers are in the full open position. Once a threat is detected, then the louvers are closed. The movement of the louvers can be accomplished by a push/pull cable, hydraulic pressure, air pressure or other means. The system in the fully open position allows for a complete unobstructed viewing area. In the semi-deployed or partial down position, the system provides partial ballistic coverage for the occupant, and still allows for some occupant vision capability. In the fully deployed, or fully closed position, the system provides full ballistic coverage for the occupant, with a small viewing area or port, which is made of ballistic grade transparent armor. This window has a frame. It would not be watertight.

United States Patent Application Publication No. 20070227430 discloses a sliding window for use in an opening in a supporting structure. The window comprises a plurality of glazing materials, an interior trim ring, and a housing having a plurality of tracks and at least one drain passage connecting each track to a surface on the housing. The drain passages are positioned downwardly from each track through the housing to a position on the surface of housing which is in fluid communication with an exterior environment. The components that comprise the window frame that holds the glazing materials can be economically produced from a unitary blank. The vertical orientation of the drain passages limits the possibility that the passages will become blocked, and thus unable to drain the water from the tracks. Furthermore, each drain passage connects the track directly to the exterior environment to avoid the possibility of one drain passage becoming blocked and urging water back into another track. This window has a frame. It would not be watertight.

United States Patent Application Publication No. 20060000404 discloses an adjustably slidable windshield assembly for a boat having a window (6) mounted within channels (8) in frame members (4) attached to T-top supports (3) on a boat. At least one clamp mechanism (14) proximate each channel is provided which can be used to secure the window at any desired open or closed position. Handles (13) are provided to assist in raising and lowering the window. This window has a frame. It would not be watertight.

United States Patent Application Publication No. 20030110718 discloses a marine window assembly for installation within a boat cabin wall that includes a piece of glazing material, a shielding member, first and second layers of sealant, and a plurality of fasteners. The first layer of sealant is disposed on a first face of the glazing material along a substantial portion of the circumferential perimeter and said second layer of sealant disposed on said second face of said glazing material. The shielding member is positioned over said second layer of sealant and said glazing material and fastening means are used to secure the shielding member, said glazing material and said first and second layers of sealant to said cabin wall against first and second substantially transverse surfaces of the opening. The first and second layers of sealant are chosen to have coefficients of thermal expansion that are substantially similar to that of the shielding member so that when the assembly is exposed to a range of temperatures, adhesion between first and second layers of sealant and shielding member will be maintained. This window cannot be opened.

What is needed is a flush mounted window for a boat. It would be preferably if it was frameless. It would be preferable if the window could be opened. It would be further preferable if the window articulated outward to clear the frame and the slid along at least a portion of the frame. It would be preferable if it was watertight when closed.

SUMMARY

The present technology is a flush mounted window for a boat. The pane of glass that moves is frameless. The window can be opened. Opening is effected by both articulating the glass outward and sliding the glass with a handle which is attached to the glass. The window opens to the outside and back towards the stern of the boat. It is watertight when closed.

In one embodiment, a window is provided, the window including a frame; a moveable glass pane, the moveable glass pane in articulatable and slidable relation to the frame; a handle, the handle including a handle shaft which is attached to the moveable glass pane at a top and a bottom region of the moveable glass pane; a top and a bottom articulating and urging mechanism, each in direct mechanical communication with the handle shaft; a top and a bottom articulating mechanism, each in indirect mechanical communication with the handle shaft; and a top and a bottom sliding assembly, which extend between the articulating and urging mechanisms and the articulating mechanisms, each sliding assembly including a slide track and a dog shaft, the slide track retained on the frame, the dog shafts slidably retained in the slide track, each dog shaft in mechanical communication with the articulating and urging mechanism and the articulating mechanism.

In the window, the handle may be located at a leading portion of the moveable glass pane.

In the window, each articulating mechanism may be located at a trailing portion of the moveable glass pane.

In the window, each articulating mechanism may include a piston which retains the trailing portion of the moveable glass pane and a dog slide arm which is in mechanical communication with the piston and the dog shaft.

The window may further comprise a fixed window which is retained by the frame.

In the window, the moveable glass pane is frameless.

The window may be a window in a boat.

In another embodiment, a method of opening a window is provided, the method comprising: providing the window as described above; a user urging the handhold towards a leading edge of the moveable glass pane; the moveable glass pane articulated outward to clear the frame; the user further urging the handhold towards the leading edge of the moveable glass pane; and the moveable glass pane sliding along a length, thereby opening the window.

FIGURES

FIG. 3 is an interior plan view of the window of the present technology in the closed position.

FIG. 4 is an interior plan view of the window of the present technology in the open position.

DESCRIPTION

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Figure 1:
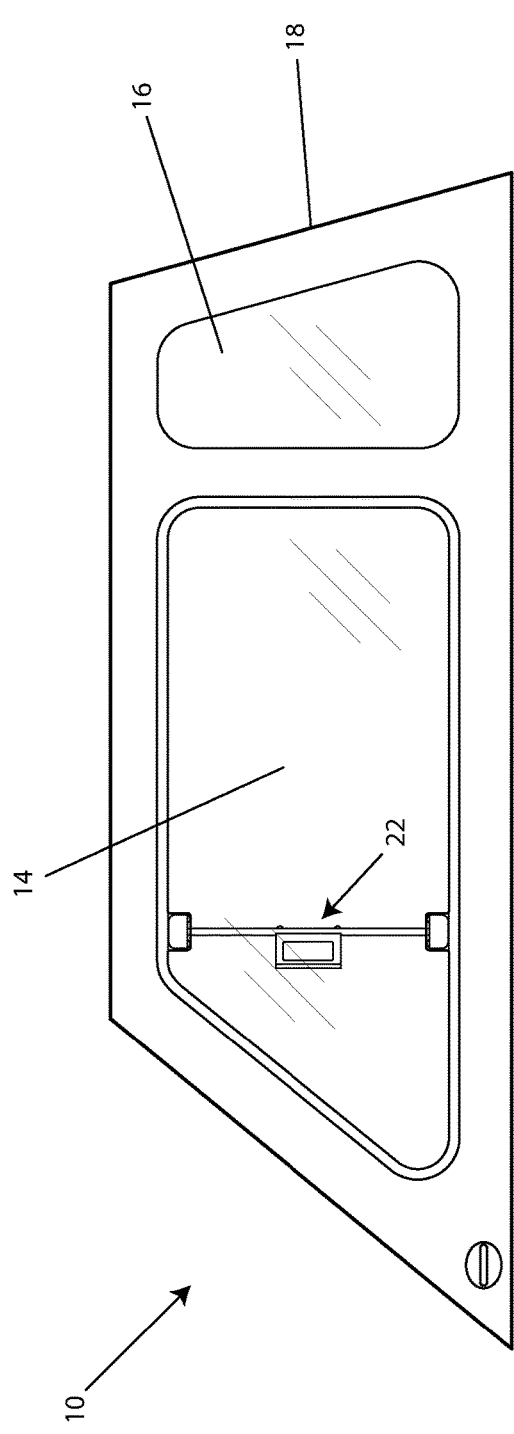
FIG. 1 is an exterior plan view of the window of the present technology in the closed position.
Figure 2:
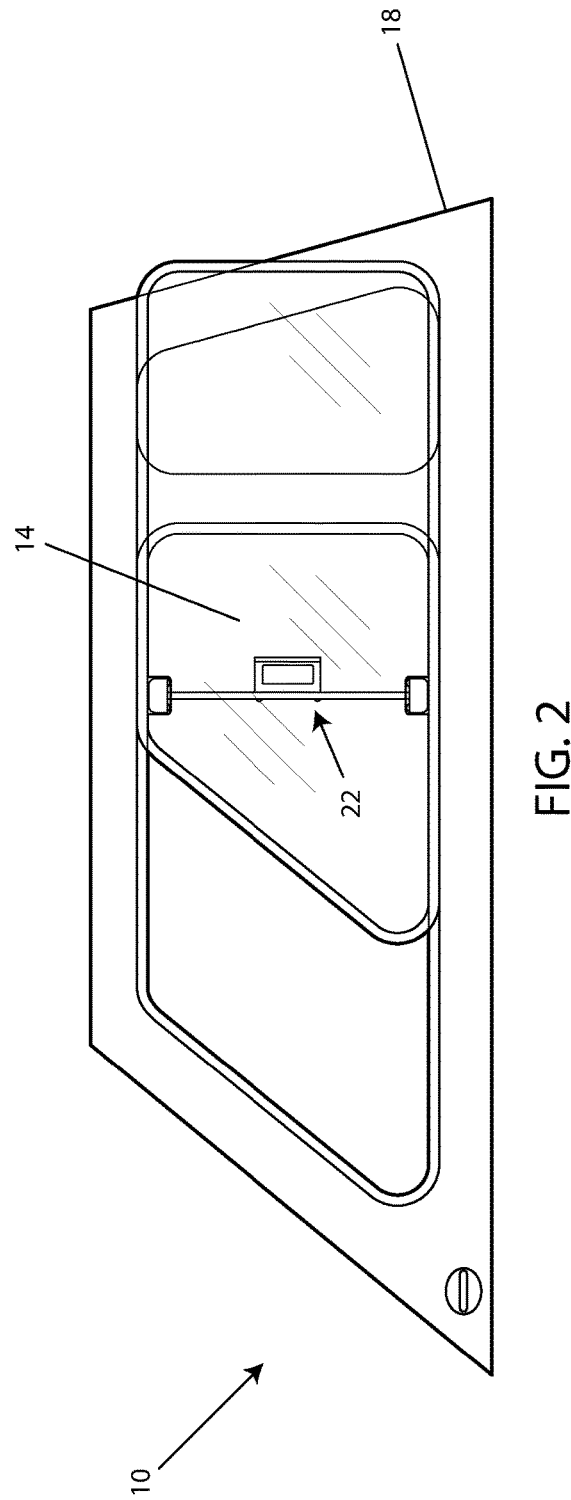
FIG. 2 is an exterior plan view of the window of the present technology in the open position.

A window assembly, generally referred to as 10 is shown in FIGS. 1 through 4. This is the port side window assembly 10 in a boat. A mirror image of this is provided for the starboard side. The window assembly 10 includes a moveable glass pane 14, a fixed glass pane 16 which is sternward of the moveable glass pane 14, a frame 18 that extends around the moveable glass pane 14 and the fixed glass pane 16 and two slider assemblies, generally referred to as 20. FIG. 1 shows an interior view of the window assembly with the moveable glass pane in the closed position, FIG. 2 shows an interior view of the window assembly with the moveable glass pane in the open position, FIG. 3 shows an exterior view of the window assembly with the moveable glass pane in the closed position, and FIG. 4 shows an exterior view of the window assembly with the moveable glass pane in the open position. It can be seen that the moveable glass pane is frameless. A handle, generally referred to as 22, extends from the top section 24 of the moveable glass pane 14 to the bottom section 26 of the moveable glass pane 14. The handle 20 includes a shaft 28 and a handhold 30. Proximate to each end 32 of the handle shaft 28 is a handle shaft bracket 34 which attaches the handle shaft 28 to the top section 24 and the bottom section 26 of moveable glass pane 14. The handle shaft 28 is rotatably mounted through the handle shaft bracket 34.

Figure 5:
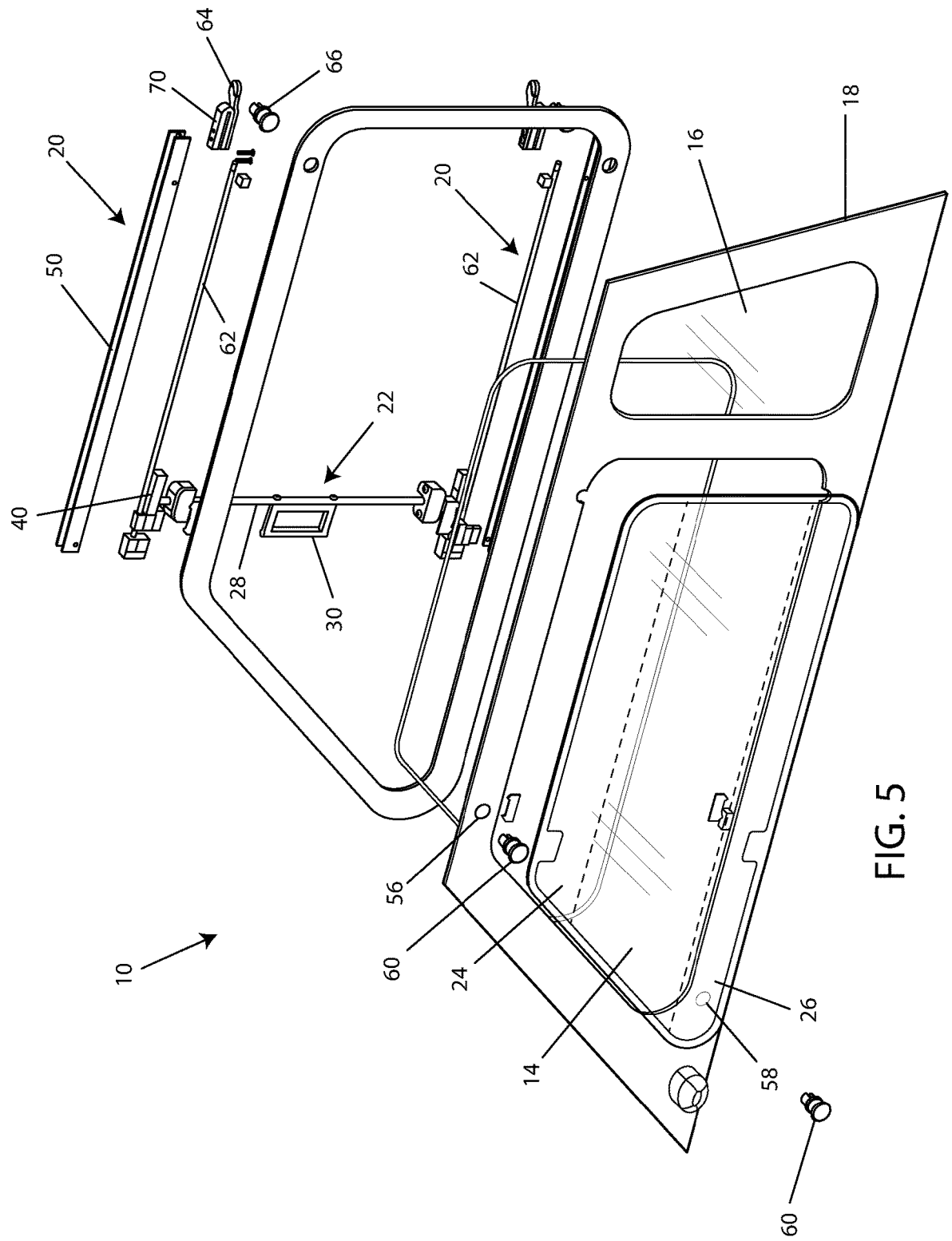
FIG. 5 is an exterior exploded view of the window of the present technology.
Figure 6:
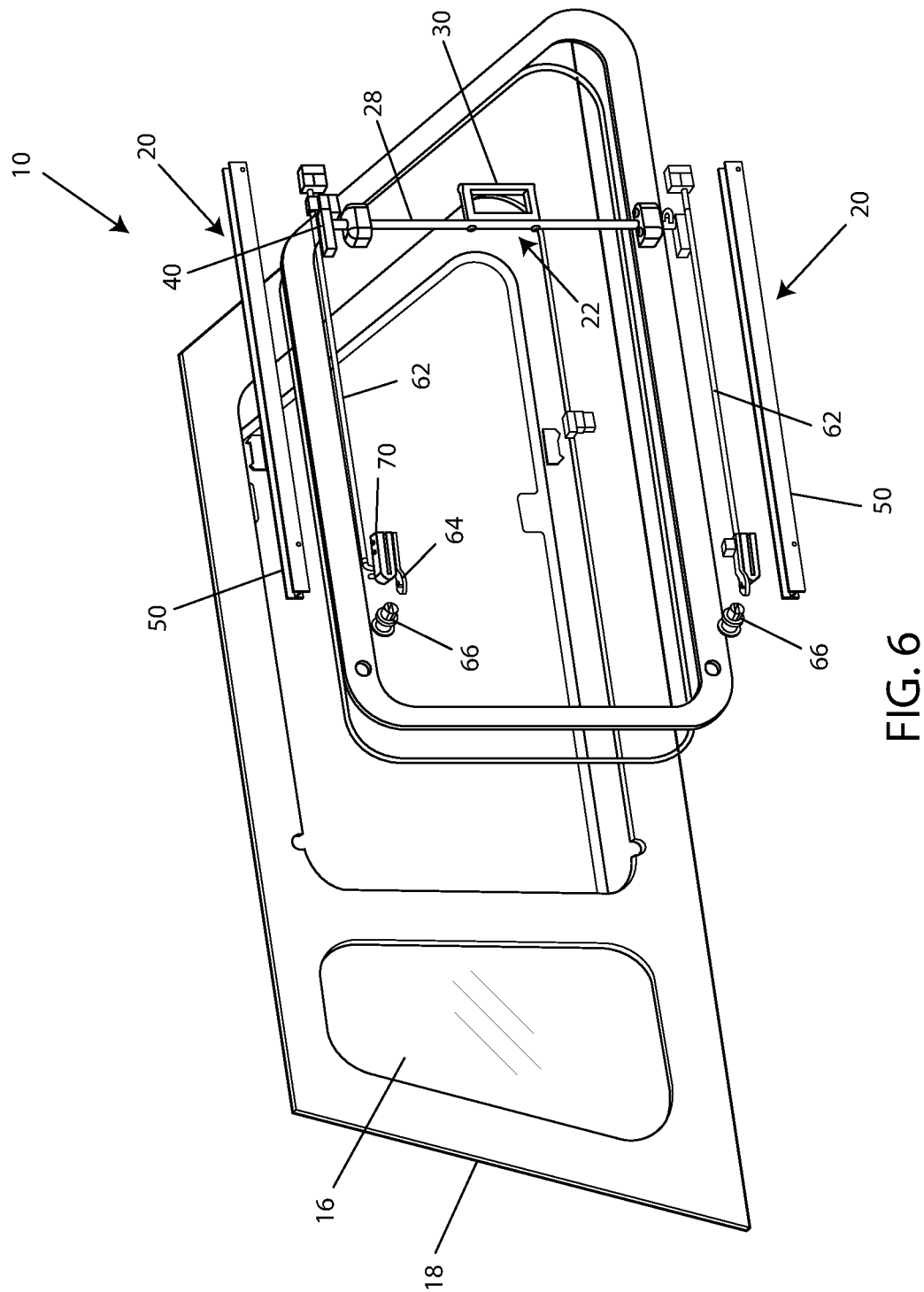
FIG. 6 is an interior exploded view of the window of the present technology.
Figure 7:
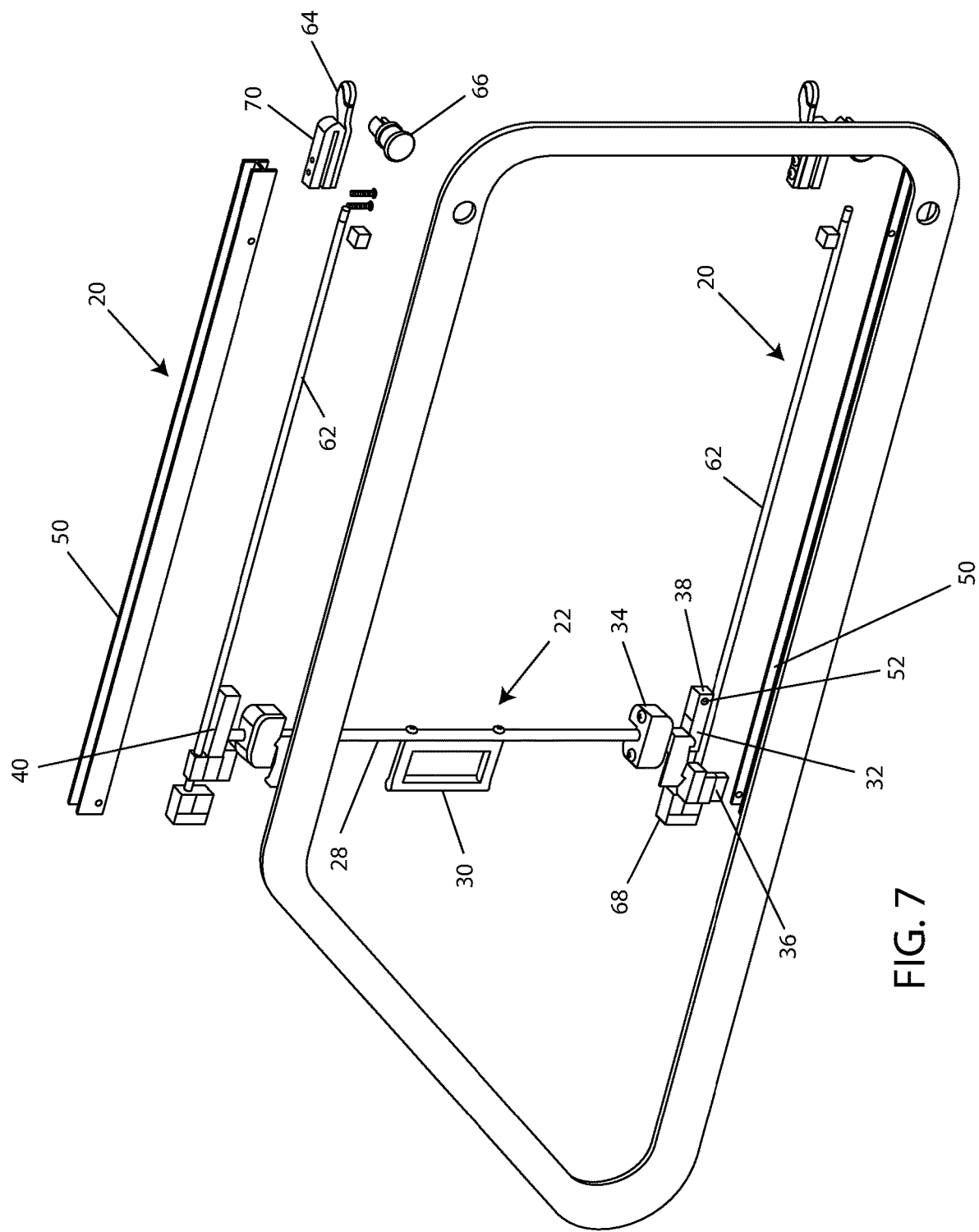
FIG. 7 is an exploded view showing the articulating and sliding system, the slider system and the articulating system of the present technology.

As shown in FIGS. 5, 6 and 7, proximate to the ends 32 of the handle shaft 28 and below the handle shaft bracket 34 is a cam lobe 36, which the handle shaft 28 abuts. The handle shaft 28 and cam lobe 36 are rotatably mounted in handle sleds 38. The handle sleds 38 include bushings to center the moveable glass pane 14. Between the end stop 68 and the handle sleds is a spring 40 around the dog shaft 62. A lock 52 is biased with a spring in the closed position. The lock is mounted in the slide tracks 50.

Also shown in FIGS. 5, 6 and 7 is the frame 18. The frame 18 has a top aperture 56 and a bottom aperture 58 each to retain a fastener 60 for retaining the slider assemblies 20. The apertures 56, 58 are located sternward in the frame 18.

Figure 8:
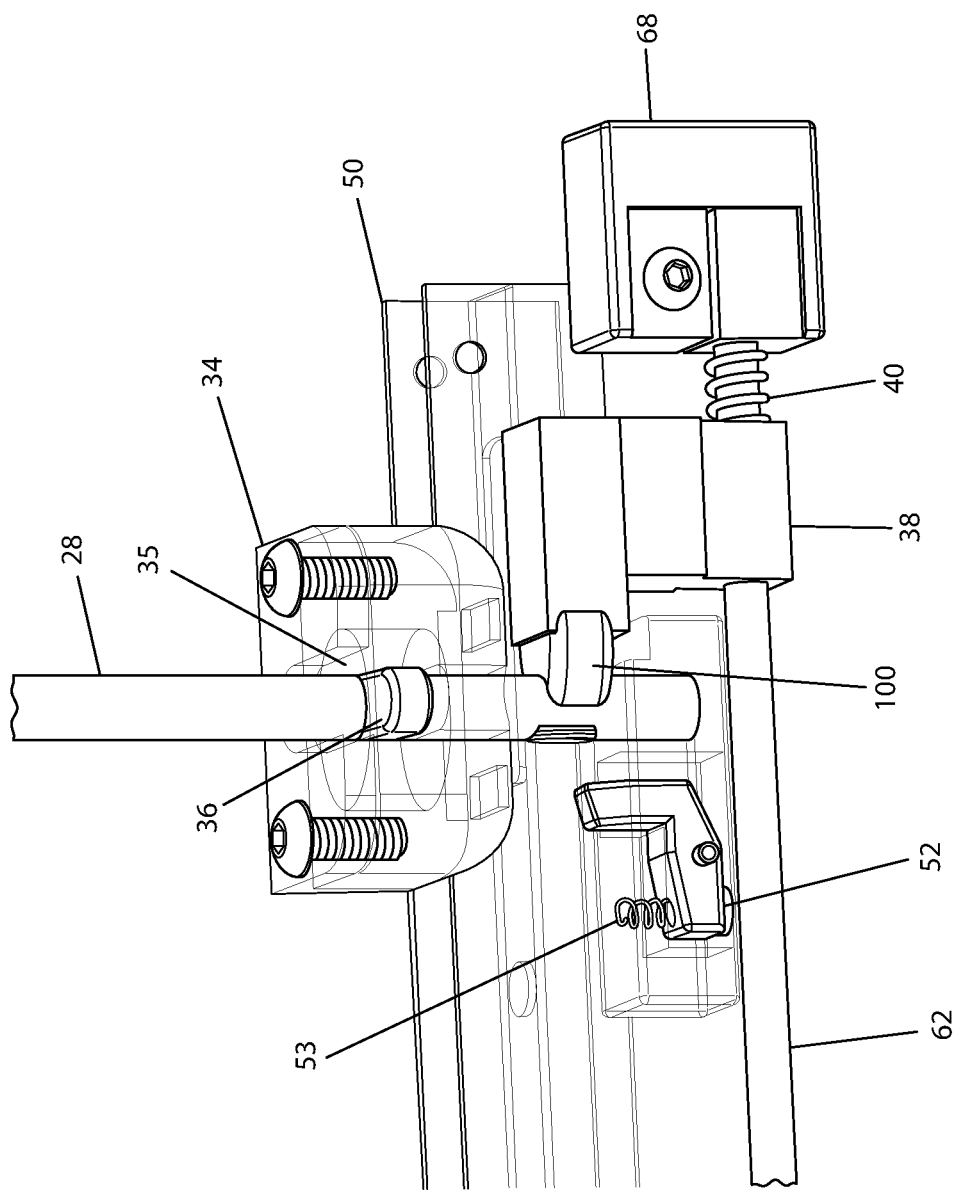
FIG. 8 is a perspective view of the components in the articulating and sliding mechanism.

As shown in FIG. 8 the handle shaft 28 is attached to the mounting bracket 34 and extends through the handle bushing 35. The track 50 retains the end block 68 and the dog block 38. The dog shaft 62 extends through the dog block 38 and terminates in the end block 68. A spring 40 is disposed around the dog shaft 62 between the dog block 38 and the end block 68. The cam 100 is retained by the dog block 38 and abuts the handle shaft 28. The lock mechanism includes a lock 52 which is biased with a spring 53.

Also shown in FIG. 8, a second cam 100 is located in an elliptical bushing. It urges the leading portion of the moveable glass pane 14 outward when the handhold 30 is pulled sternward in order to clear the frame 18. The cam lobe 36, spring 40 and the lock 52 collectively form the leading portion mechanism. This leading portion mechanism is a combined articulating and urging mechanism. In use, when the handhold 30 is pulled further sternward, the cam lobe 36 is urged to unlock the lock 52, and the dog shaft is urged along the slide tracks 50, leading to the moveable glass pane 14 to slide along a length of the frame 18.

Moving to the slider assemblies 20, the slide tracks 50 are attached to the frame 18 with the fasteners 60. A dog shaft 62 is moveably housed in the slide track 50 and is attached to the handle sled 38 at the leading end and to a slider 70 at the trailing end. The moveable glass pane 14 sits in a notch in the piston 66. The end stop 68 is mounted on the leading end of the dog shaft 62 and is mounted in the slide tracks 50.

Figure 9:
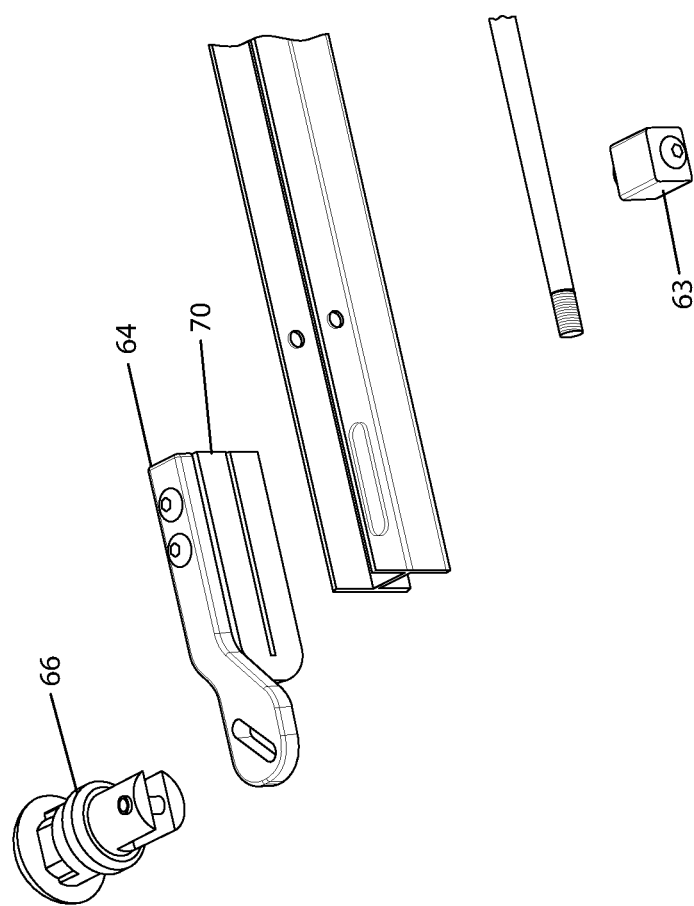
FIG. 9 is a close-up of the articulating mechanism.

As shown in FIG. 9, a piston 66 is retains the moveable glass pane 14 in a notch. The dog slide arm 64 slides back and forth when the dog shaft 62 is adjusted by rotation of the handle 22. A channel spacer 63 maintains track spacing.

In use, when the handhold 30 is pulled sternward, the dog slide arm 64 urges the piston 66, which urges the trailing part of the moveable glass pane 14 outward. Once the moveable glass pane 14 is clear of the fixed glass pane 16 and the frame 18 a user can further urge the handle 22 sternward and the moveable glass pane 14, the handle 22 and associated parts are urged sternward. The dog slide arm 64, the slider 70 and the piston 66 collectively form the trailing portion mechanism, which is strictly an articulating mechanism. The slider 70 is slidably retained in the slide tracks 50 and is attached to the dog shaft 62.

Other components including interior trim, a gasket for between the frame and interior trim, bushings, roll pins, glide pins, O-rings, spacers and sealant are included as would be known to one skilled in the art.

In use, the handhold 30 is pulled sternward (or more generally, towards the leading edge of the moveable glass pane 14), the handle shaft 28 rotates, actuating the cam lobe 36, leading to the lock 52 to unlock. The second cam urges the trailing part of the moveable glass pane 14 outward. Concomitantly, the dog shaft 62 is urged sternward causing the dog slide arm 64 to be urged to unlock the lock 70 and to actuate the piston 66. The piston 66 urges the trailing part of the moveable glass pane 14 outward. Once the moveable glass pane 14 is clear of the fixed glass pane 16 and the frame 18 a user can further urge the handhold 30 sternward and the moveable glass pane 14, the handle 22 and associated parts are urged sternward. The moveable glass pane 14 therefore is articulated outwards and then slides along clearing the frame 18 and the fixed glass pane 16. The trailing portion of the moveable glass pane 14 therefore is articulated outwards and then slides along under direct mechanical communication with the handle 22. The trailing portion of the moveable glass pane 14 therefore is articulated outwards and then slides along under indirect mechanical communication with the handle 22.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize or be able to ascertain using no more than routine experimentation, many equivalents to the specific example embodiments specifically described herein. Such equivalents are intended to be encompassed in the scope of the claims, if appended hereto or subsequently filed.

The invention claimed is:

1. A window for a vehicle, a vessel or a trailer, the window including a frame; a moveable glass pane, the moveable glass pane in articulatable and slidable relation to the frame; a handle, the handle including a handle shaft which is attached to the moveable glass pane at a top and a bottom region of the moveable glass pane; a top and a bottom articulating and urging mechanism, each in direct mechanical communication with the handle shaft; a top and a bottom articulating mechanism, each in indirect mechanical communication with the handle shaft; and a top and a bottom sliding assembly, which extend between the articulating and urging mechanisms and the articulating mechanisms, each sliding assembly including a slide track and a dog shaft, the slide track retained on the frame, the dog shafts slidably retained in the slide track, the dog shaft of the top sliding assembly in mechanical communication with the top articulating and urging mechanism and the top articulating mechanism and the dog shaft of the bottom sliding assembly in mechanical communication with the bottom articulating and urging mechanism and the bottom articulating mechanism.

2. The window of claim 1, wherein the handle is located at a leading portion of the moveable glass pane.

3. The window of claim 2, wherein the top and the bottom articulating mechanisms are located at a trailing portion of the moveable glass pane.

4. The window of claim 3, wherein the top and the bottom articulating mechanisms includes a piston which retains the trailing portion of the moveable glass pane and a dog slide arm which is in mechanical communication with the piston and the dog shaft.

5. The window of claim 4, wherein each articulating and urging mechanism includes a first cam lobe, which the handle shaft abuts and a second cam lobe which urges the leading portion of the moveable glass pane.

6. The window of claim 5, further comprising a fixed window which is retained by the frame.

7. The window of claim 6, wherein the moveable glass pane is frameless.

8. The window of claim 1, wherein the window is in a boat.

9. A method of opening the window of claim 1, the method comprising: a user urging the handhold towards a leading edge of the moveable glass pane; the moveable glass pane articulated outward to clear the frame; the user further urging the handhold towards the leading edge of the moveable glass pane; and the moveable glass pane sliding along a length, thereby opening the window.

10. A window for a vehicle, a vessel or a trailer, the window including a frame; a moveable glass pane, the moveable glass pane in articulatable and slidable relation to the frame; a handle, the handle including a handle shaft which is attached to the moveable glass pane at a top and a bottom region of the moveable glass pane at a leading portion of the moveable glass pane; a top and a bottom articulating and urging mechanism, each in direct mechanical communication with the handle shaft; a top and a bottom articulating mechanism, each in indirect mechanical communication with the handle shaft and each located at a trailing portion of the moveable glass pane; and a top and a bottom sliding assembly, which extend between the articulating and urging mechanisms and the articulating mechanisms, each sliding assembly including a slide track and a dog shaft, the slide track retained on the frame, the dog shafts slidably retained in the slide track, each dog shaft in mechanical communication with the articulating and urging mechanism and the articulating mechanism, wherein each articulating mechanism includes a piston which retains the trailing portion of the moveable glass pane and a dog slide arm which is in mechanical communication with the piston and the dog shaft.

11. The window of claim 10, wherein each articulating and urging mechanism includes a first cam lobe, which the handle shaft abuts and a second cam lobe which urges the leading portion of the moveable glass pane.

12. The window of claim 11, further comprising a fixed window which is retained by the frame.

13. The window of claim 12, wherein the moveable glass pane is frameless.

14. The window of claim 13, wherein the window is in a boat.

\* \* \* \* \*